United States Patent [19]
Kurelek

[11] Patent Number: 6,152,201
[45] Date of Patent: Nov. 28, 2000

[54] TREE FELLING DISC SAW HEAD WITH LARGE TREE ACCUMULATION AREA

[75] Inventor: John Kurelek, Brantford, Canada

[73] Assignee: Tigercat Industries, Inc., Brantford, Canada

[21] Appl. No.: 09/342,258

[22] Filed: Jun. 29, 1999

Related U.S. Application Data

[63] Continuation of application No. 09/134,730, Aug. 17, 1998, Pat. No. 5,931,210, which is a continuation-in-part of application No. 08/886,159, Jun. 30, 1997, Pat. No. 5,794,674.

[51] Int. Cl.[7] .................................................. A01G 23/08
[52] U.S. Cl. .............................. 144/336; 83/928; 144/4.1; 144/34.1
[58] Field of Search ........................... 83/853, 855, 928; 144/4.1, 24.13, 34.1, 34.5, 336

[56] References Cited

U.S. PATENT DOCUMENTS 5,004,026  4/1991  MacLennan et al. .................... 144/4.1

Primary Examiner—W. Donald Bray
Attorney, Agent, or Firm—Hodgson Russ Andrews Woods & Goodyear LLP

[57] ABSTRACT

The felling and accumulating head has a large accumulation or storage area for severed trees, separate from the severance area at the front of the head, obtained by elevating the accumulation area to extend preferably at least over the rim of the saw disc, and preferably outwardly and rearwardly over the teeth of the saw. Trees are swept from the severance area, up a small ramp into the accumulation area, by arms, at least one of which preferably sweeps at least partially over the saw motor so as to be able to sweep trees a substantial distance rearwardly, i.e. at least beyond an imaginary lateral line through the saw axis.

35 Claims, 12 Drawing Sheets

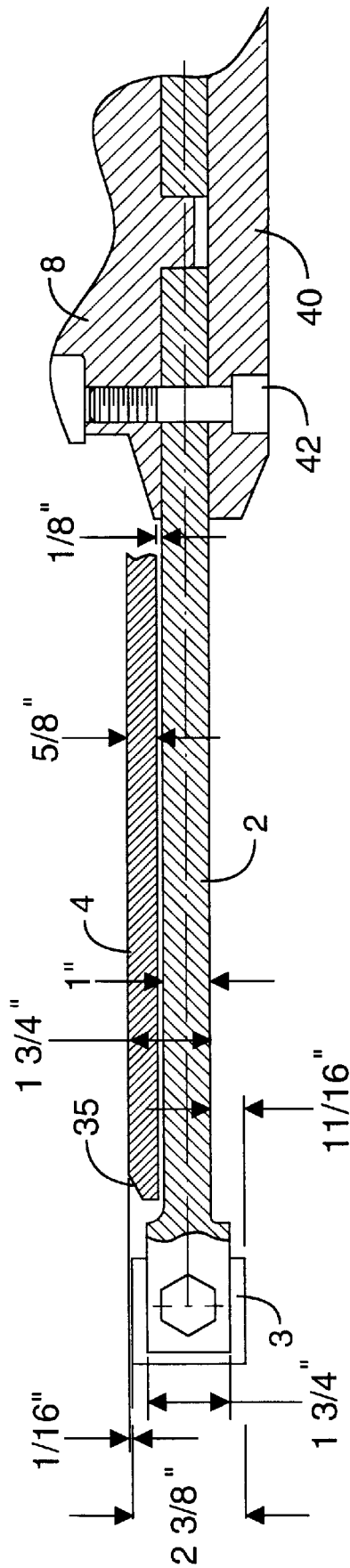
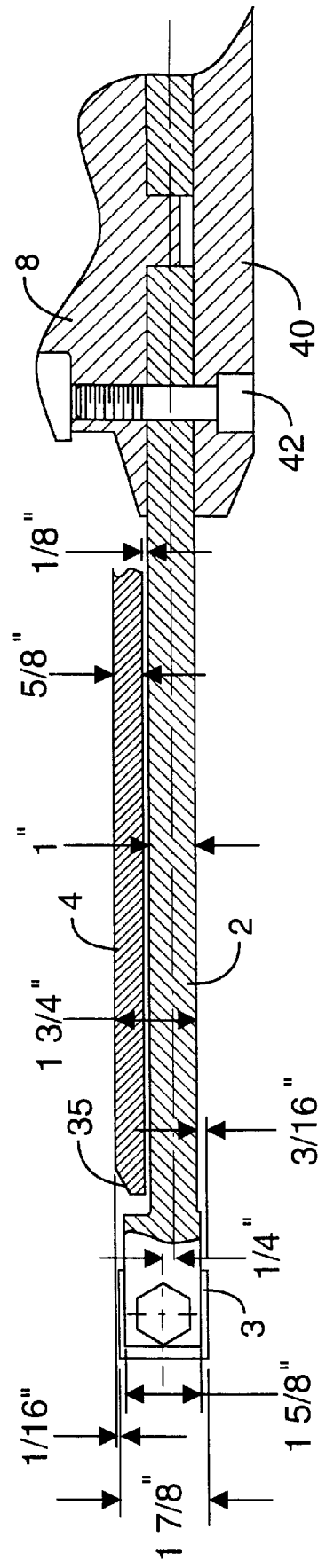
FIG.16A (PRIOR ART)
FIG.16B (PRIOR ART)

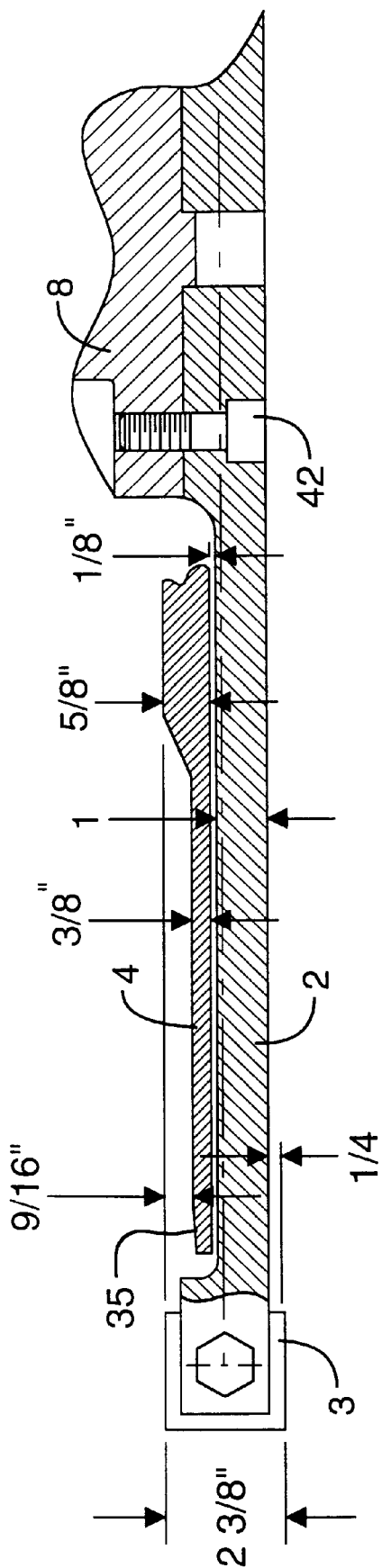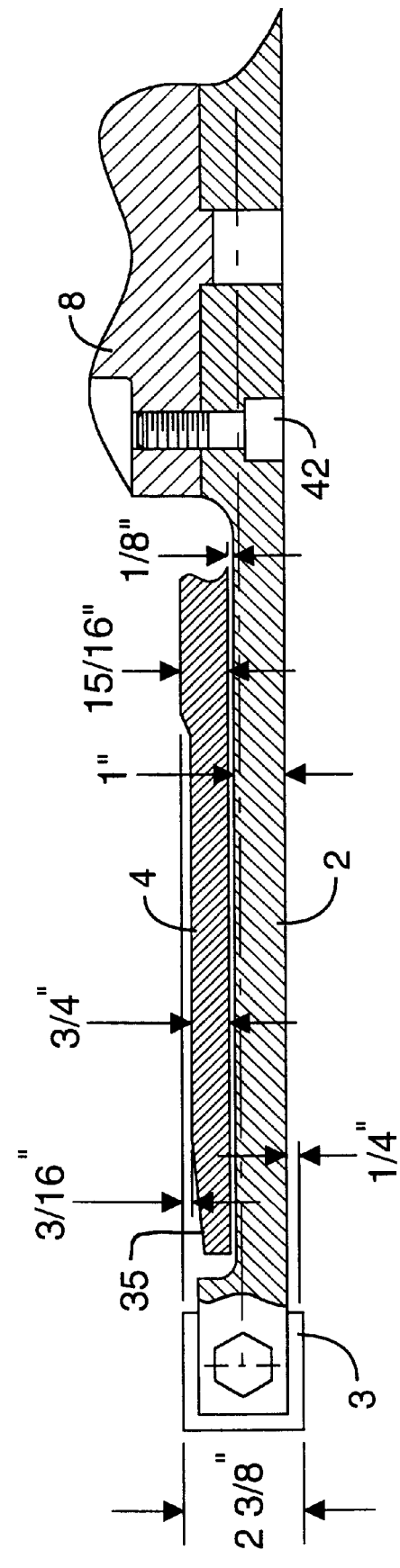

TREE FELLING DISC SAW HEAD WITH LARGE TREE ACCUMULATION AREA

REFERENCE TO RELATED APPLICATIONS

This is a continuation of application Ser. No. 09/134,730, filed Aug. 17, 1998, now U.S. Pat. No. 5,931,210; a which was a continuation-in-part of application Ser. No. 08/886,159, filed Jun. 30, 1997, now U.S. Pat. No. 5,794,674, granted Aug. 18, 1998.

BACKGROUND OF THE INVENTION

This invention relates to disc saw heads for tree felling.

In U.S. Pat. No. 5,697,412, incorporated by reference herein, the present inventor explained the desirability of being able to store maximum severance size trees, i.e. trees of the maximum size severable by the severance means, in a position totally clear of the severance area at the front of the tree-cutting head. (Throughout this specification, "severance area" refers generally to the area of the saw occupied by a tree as it is being severed, up to the point of severance.) In the '412 patent, trees were stored in an accumulation area to one side and to the rear of the centerline of a shear or other severance means, and were swept from the severance area to the accumulation area by taker and tucker arms which both pivoted from the opposite side of the centerline.

In the patent, it was contemplated that severance means other than a shear, such as a saw, could be used. However, in adapting the invention for use with a saw, it was realized that further innovations were desirable in order to make optimum use of some of the principles of the invention.

Examining the geometry and relative dimensions of a disc saw and its maximum tree diameter cutting capacity reveals some inescapable design restrictions. If the maximum tree diameter tree which can be cut (without resorting to multiple cuts) is 22 inches, for example, and if the motor or saw hub has a diameter of say 14 inches, for example, then the diameter of the saw disc has to be at least 58 inches, i.e. 22 inches plus 14 inches plus 22 inches. Add to this a protective housing with some clearance for wood chip escape, and a head more than 5 feet wide at its base would have to be carried around. This is wider than desirable, taking into account various factors including frequently limited space between adjacent trees.

Thus when designing a disc saw head where a large tree accumulation capacity is desired, it is not sufficient to simply increase the diameter of the disc beyond what is dimensionally needed to sever the tree, since this produces an excessively large head. Instead, it is preferable to make the saw just big enough to get through the largest desired tree, and then try to use whatever storage space can be found. Typically in the prior art, this has meant using the severance space itself, and any additional space on the surface of the disc.

However, the amount of additional space that others have had available to them, prior to present invention, had been hindered by the essential construction and operating manner of such disc saws. In U.S. Pat. Nos. 5,377,731 (Wildey) and 5,303,752 (MacLennan), it is apparently assumed that severed trees should only be supported on a butt plate (which covers the inner saw disc), and not on the rim which consists of the sides of the cutting teeth. This is so that neither tossing nor burning contact between the tree butt and the disc and tooth top surfaces occurs. MacLennan makes some extraordinary effort to make a slightly larger radius butt plate than some others have, so that more trees will fit onto it. Both patents show the top edge of the teeth only barely high enough to cut a path for the butt plate.

Conventional buff plates are sunk into the top of disc saws, and thus are confined to radii always less than the saw radius, by the radial dimension of the teeth and their rim. Thus in the above example if 3 inches was used for the rim and teeth, then a maximum stored tree diameter which is 3 inches less than the maximum size, i.e. only 19 inches instead of 22 inches would have to be accepted. This would not meet the inventor's desire to store a maximum-size tree separate from the severance space.

A primitive partial solution to permitting a single maximum diameter tree to be carried was introduced by Koehring-Waterous a number of years ago. In their saw, illustrated in plan view in FIG. 17 (prior art), a small ramp plate 101 was positioned at the front of the saw directly beside the severance area, angled upwardly over the rim and teeth 102 of the saw. This allowed a single maximum-diameter tree 103 to be pushed by a taker arm 104 and held by a tucker arm 105 so that one side would encroach slightly into the area above the saw rim and teeth, so that it could be lifted slightly to as to be carried without contacting the saw. However, the plate merely lifted one edge of the tree over the rim, with most of the tree still being positioned essentially on or above the butt plate, and in the severance area, with no separate accumulation or storage area. As can be seen clearly from the overlapping dotted-line circles 103 and 103' in FIG. 17, it thus was not possible to cut and store a maximum-diameter tree and continue cutting another maximum-size tree, if any other tree. There was no separate storage space removed from the severance area.

Another problem in the prior art is that conventional butt plates, because of the height of their upper surfaces relative to the saw kerf, do not permit the saw disc to be angled slightly forwardly to facilitate continuous cutting, without the butt plate wedging down onto the saw disc, which is clearly undesirable for obvious reasons. This will be explained in greater detail below.

SUMMARY OF THE INVENTION

In view of the preceding, it is an object of the invention to provide an improved disc saw tree felling head, with a large accumulation area for severed trees, which is not limited in size specifically by the saw disc diameter, and which provides for storage of trees away from the severance area.

In the following description, the "front" of the saw means the front in relation to the normal feed direction, i.e. the direction of advance of the saw towards the tree. In most embodiments this will correspond to the direction of advance of the vehicle, but not necessarily. For example, as in U.S. Pat. No. 4,446,897 by the present inventor, incorporated by reference herein, the saw head could be mounted on the end of a boom, which may be swung sideways relative to the vehicle to cut through a tree. Similarly, laterally refers to a direction generally at right angles to the direction of advance, and rearwardly means in the opposite direction from the direction of advance.

Similarly, when the terms "vertical" or "horizontal" or the like are used, it should be understood that this is with reference to the normal operating orientation of the saw, i.e. with the saw rotating about a generally vertical axis, in a generally horizontal plane. It should be clearly understood that from time to time in operation, the saw may be tilted slightly or in fact to a considerable degree. "Vertical" and "horizontal" should therefore be viewed as relative, nominal terms referring to the normal operating position of the saw.

In the invention, trees are severed and then swept from the buft plate in the severance area up a ramp into a large, elevated accumulation area. The bottom plate of the accumulation area is high enough to extend at least over part of the rim of the saw disc, and as preferred, over and well beyond the saw teeth. Thus the accumulation area is not restricted to the area above the saw disc, and can be optimally located and shaped to suit center of gravity preferences and taker and tucker arm geometry needs. The accumulation area preferably is far enough from the severance area that even a maximum-size tree can be totally severed and then swept away from the severance area and up the ramp to the accumulation area, thus allowing cutting to continue. The ramp preferably does not encroach on the tree severance space, so that in general, trees are not lifted until they are completely severed. The severance space preferably is sufficiently large to accommodate a maximum-size tree without that tree coming into contact with the ramp to the accumulation area.

The accumulation area preferably also extends a significant distance so rearwardly from the severance area on one side of the head, i.e. well beyond an imaginary lateral line through the saw axis. Arms are pivotally mounted, preferably but not necessarily on the other side of the head from the accumulation area, configured so as to sweep trees from the severance area into the accumulation area. To maximize the distance by which the accumulation area may extend rearwardly, the arms preferably are pivoted such that at least portions thereof sweep over the saw axis.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIGS. 16A to 16D are various alternative cross-sections each showing the saw disc, a saw tooth, and the butt plate, FIGS. 16A and 16B being prior art;

DETAILED DESCRIPTION OF THE PREFERRED EMBODIMENT

Figure 1:
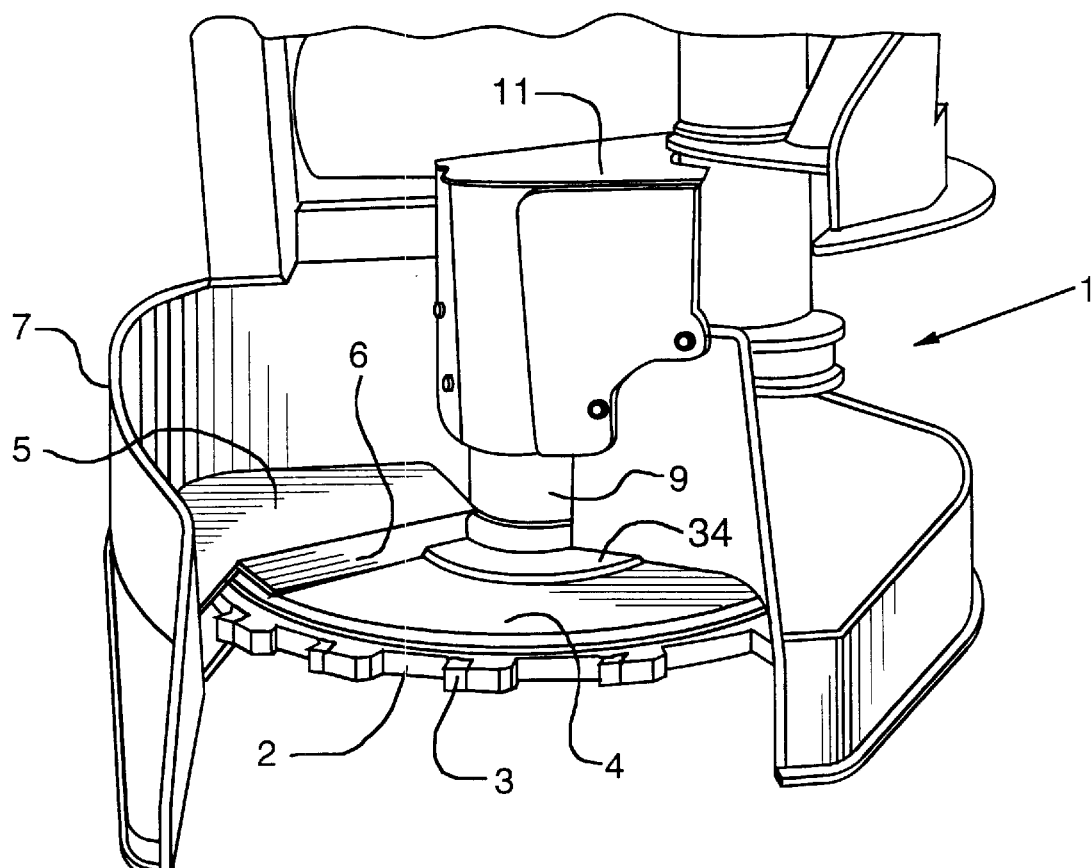
FIG. 1 is a perspective view of the disc saw and its housing.
Figure 2:
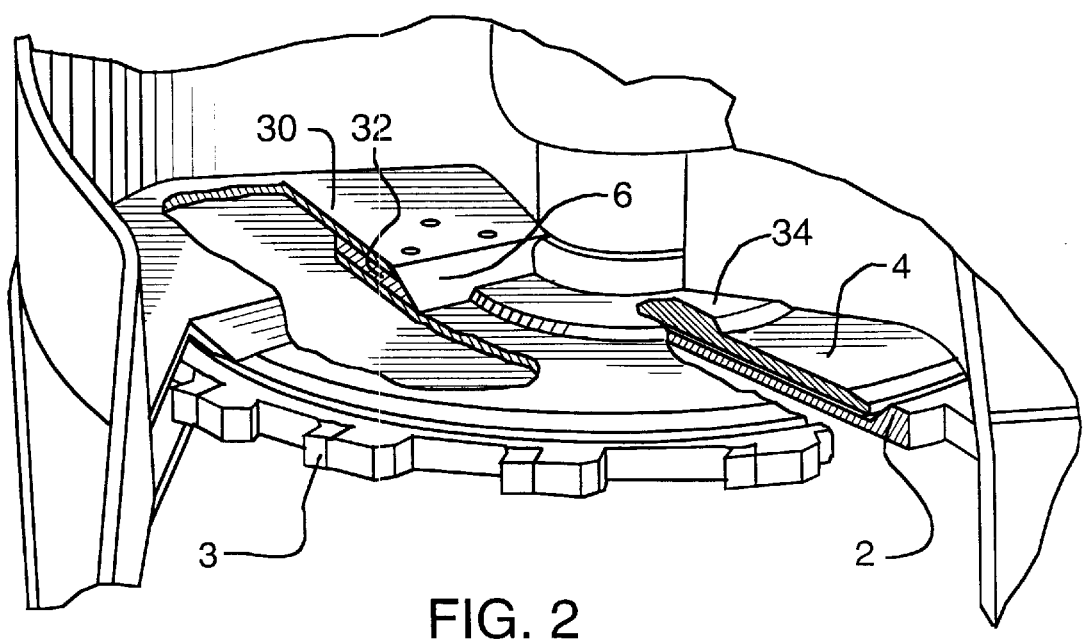
FIG. 2 is a cutaway perspective view of the saw and its housing, corresponding to FIG. 1.

FIGS. 1 and 2 show the lower portion of the feller head 1, which includes a disc saw 2 with teeth 3, a butt plate 4 just above the upper surface of the disc saw, an accumulation area 5 separated from the butt plate by a ramp 6, and a protective skirt 7. The disc saw is mounted beneath a spindle 8 hidden behind a protective housing 9, and is driven by a motor 10 hidden behind a protective housing 11. These components will be described in greater detail below.

Most of the circumference of the saw is shrouded for obvious safety reasons. The exposed area of the saw, i.e. where the cutting takes place, is normally at the front thereof. However, in some embodiments the cutting could take place at one side, as in U.S. Pat. No. 4,446,897 by the present inventor. The support frame for the saw head could be at the end of a boom, for example, not immediately adjacent the vehicle as in the preferred embodiment. Thus in general, "forward" and "rearward" in this specification and its claims are with respect to the head itself and its direction of advancement, not necessarily with respect to the vehicle.

Figure 3:
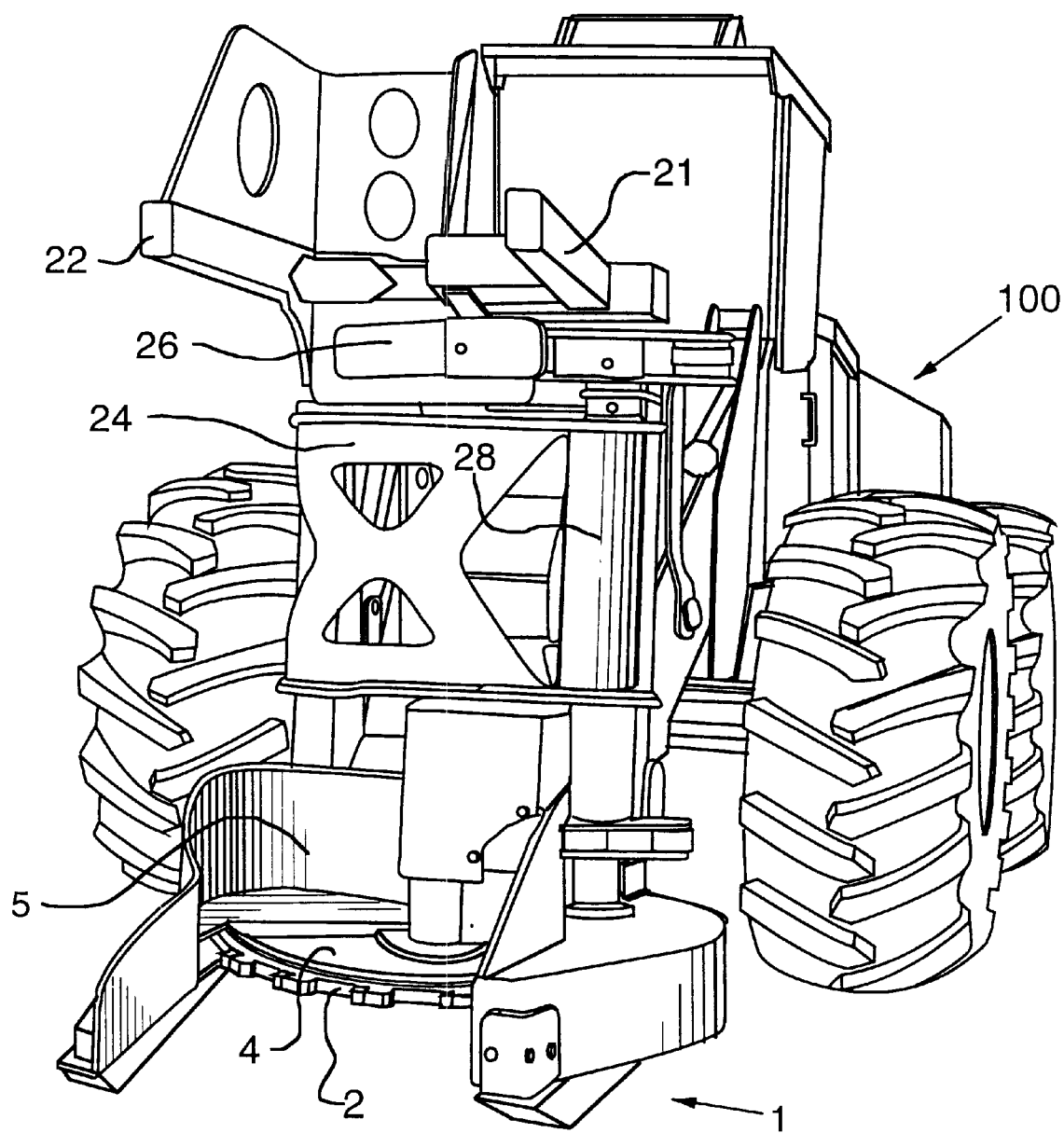
FIG. 3 is a perspective view of the saw head mounted on a carrier.

As seen in FIG. 3, the head I in the preferred embodiment is carried on a frame attached to the front of a typical carrier or logging vehicle 100. The attachment is conventional, and virtually identical to that described in the above-mentioned U.S. Pat. No. 5,697,412. The frame includes two vertical members 20 which each have upper and lower mounting flanges 21 for mounting to the conventional hydraulically-actuated vehicle-mounted linkage which allows the head to be raised and lowered, moved up and down, and tilted relative to the vehicle. Side to side motion and pivoting about a vertical axis are not necessary or provided in the illustrated embodiment, although full ranges of motion are provided when the head is boom mounted.

The frame includes two generally horizontal horns 21 and 22 which project forwardly to define an upper pocket above the accumulation area 5, to hold the trees in a generally vertical position, or preferably angled slightly inwardly. As in the above-mentioned U.S. Pat. No. 5,697,412, taker and tucker arms 24 and 26 respectively are pivotally mounted on the frame, preferably but not necessarily on the opposite side of the feller head centerline from the accumulation area 5, and preferably but not necessarily on a single pivot axis 28. These arms may be referred to as "taker" and "tucker" arms respectively.

Figure 4:
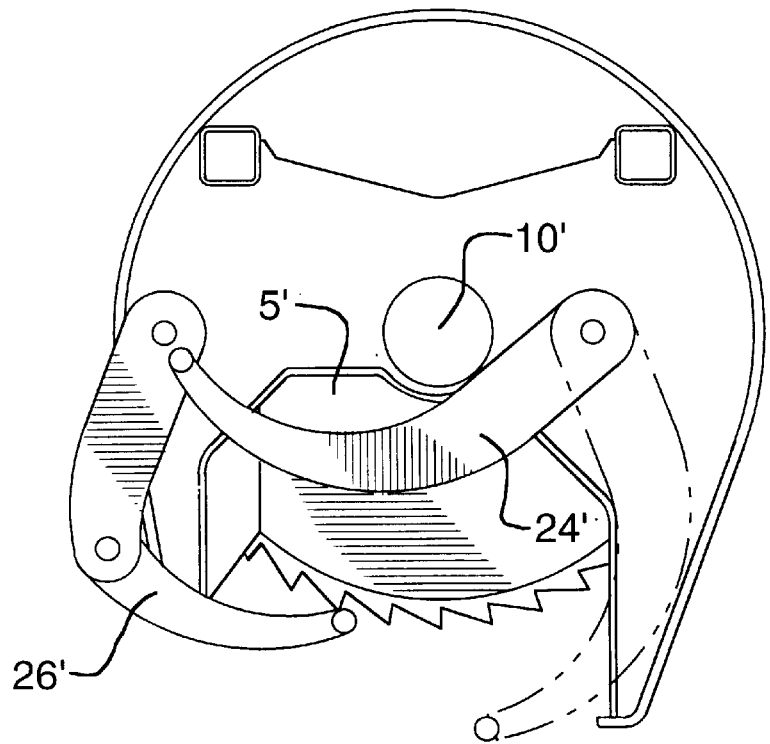
FIG. 4 (prior art) is a plan view of a typical prior art accumulation area and taker and tucker arms.

FIG. 4 shows a typical prior art arrangement, with a small storage area 5' on the butt plate itself, and taker and tucker arms 24' and 26' on opposite sides of the centerline. Either or both of the taker and tucker arms typically are blocked by the motor 10', and thus can only rotate as far as the position shown in FIG. 4, i.e. trees can only be pushed rearwardly to a limited degree. Furthermore, with arms on both sides, space is taken up on both sides, leaving relatively little remaining space for tree storage, and essentially no space for a separate accumulation area.

Figure 5:
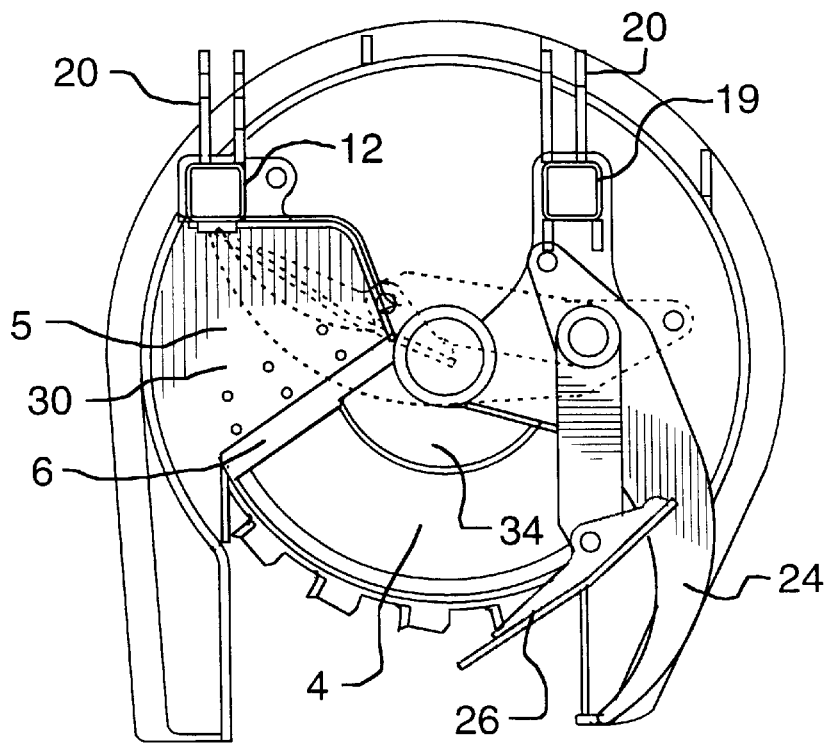
FIG. 5 is a plan view of the preferred embodiment, showing the taker and tucker arms.
Figure 6:
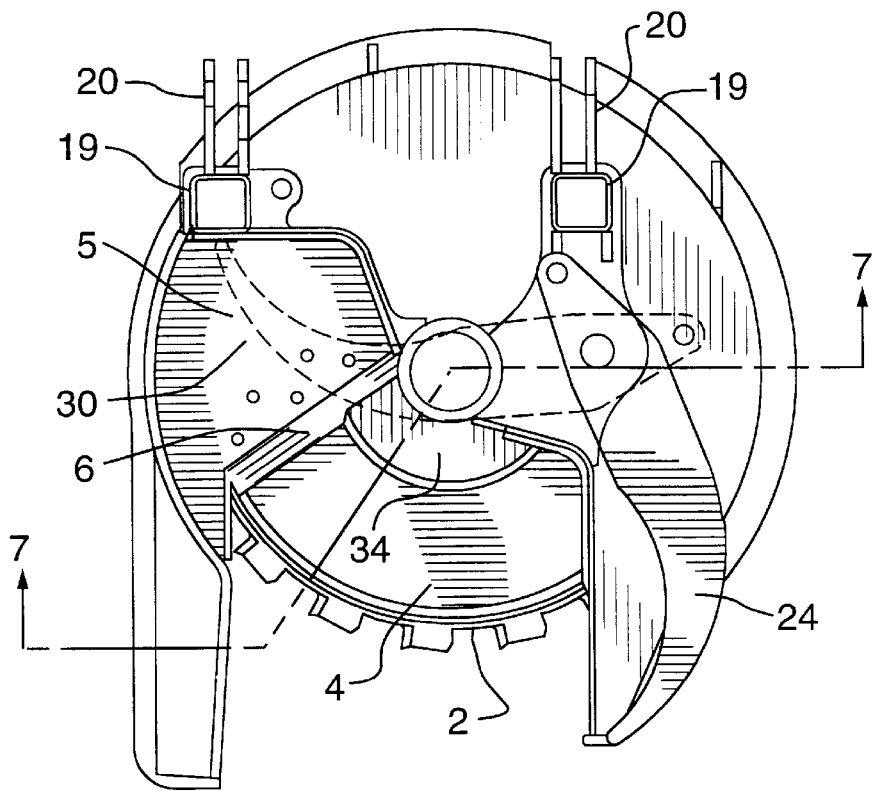
FIG. 6 is a plan view of the preferred embodiment, showing just the taker arm.
Figure 7:
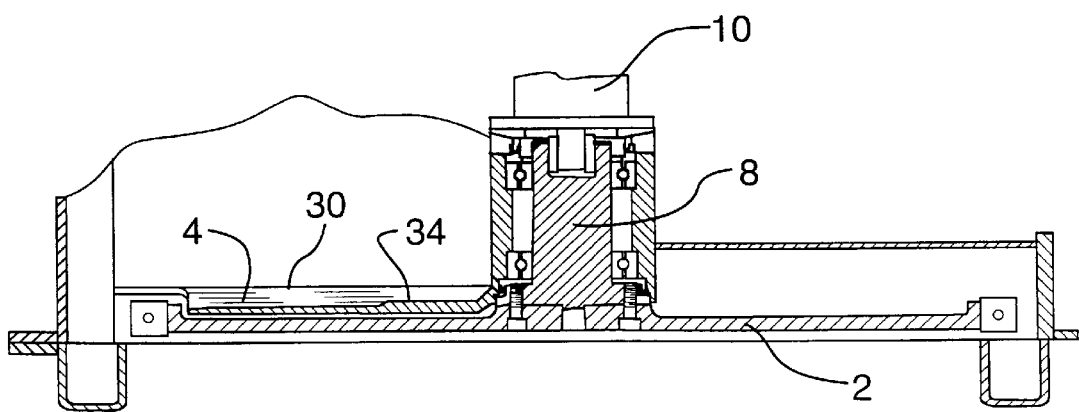
FIG. 7 is a cross-sectional elevation view, at 7—7 of FIG. 6.
Figure 8:
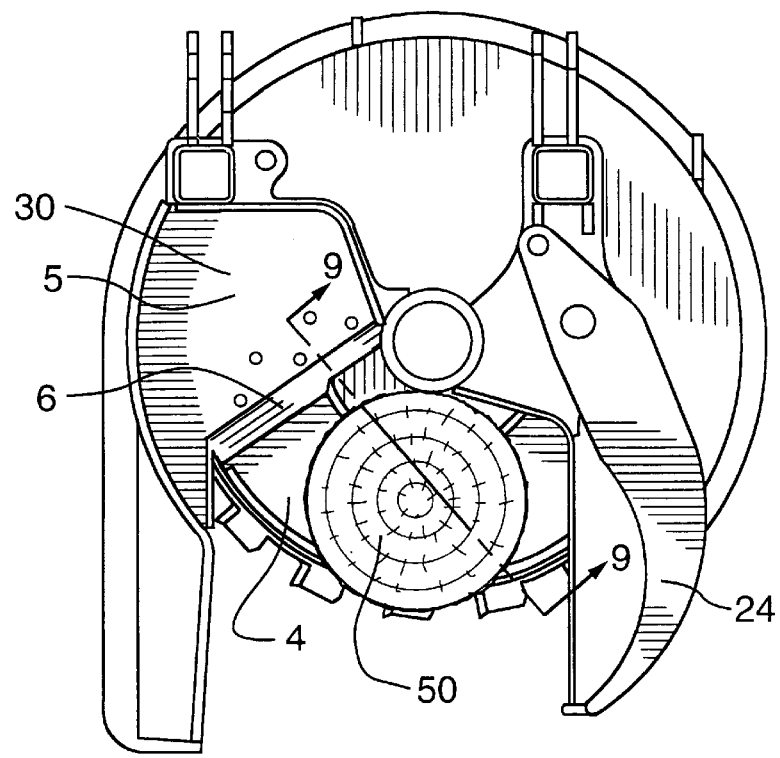
FIG. 8 is a plan view of the preferred embodiment, showing a large tree just severed.
Figure 10:
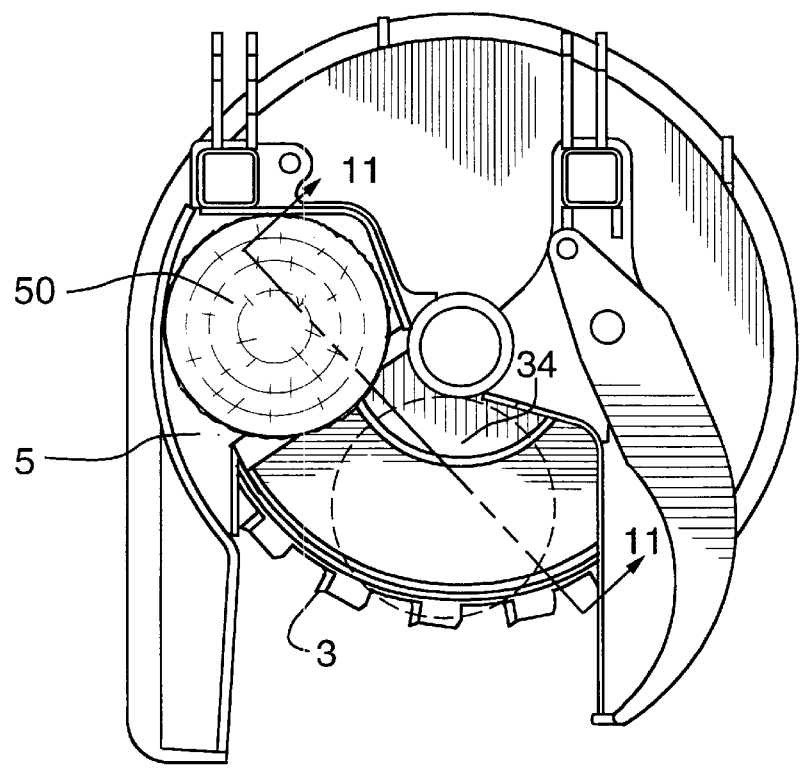
FIG. 10 is a plan view of the preferred embodiment, showing a large tree stored in the accumulation area.

In the present invention, the arms therefore preferably are both on the same side of the centerline, namely the side opposite the accumulation area. In FIGS. 6, 8 and 10, only the taker arm 24 is shown, for greater clarity. The tucker arm 26 is shown only in FIG. 3 and FIG. 5. In the invention, both the taker arm and the tucker arm preferably can pivot fully or at least partially over the motor, as shown in FIG. 5. This could be accomplished by having a taker arm which is quite high, but preferably is accomplished by virtue of a shorter than conventional spindle 8 being used, as shown in FIG. 7. This ability of the taker and tucker arms to pass over the motor permits trees to be tucked back much farther than would be the case if the arms were blocked by the motor. It is of course the leading edge of the arms, i.e. the edges which contact the trees, which area most relevant in this regard. It is not necessarily the case that the entire arms pass over the motor or saw axis.

In embodiments where a belt or gear drive might be used instead of a motor, height of the motor is not then a problem. The arms preferably should be such that at least portions thereof still swing over the saw axis.

However, regardless of how the arms are configured and where they pivot from, it should be clearly understood that in its broadest sense, the invention relates to the elevated accumulation area which is separate from the severance area, and which preferably extends at least beyond the inner circumference of the saw tooth rim, and preferably beyond the circumference of the saw so as to maximize the storage space. This concept can be employed whether or not the arms sweep from the side opposite the accumulation area and fully or partially over the saw axis, although not with the optimum results achieved by the preferred embodiment.

Figure 17:
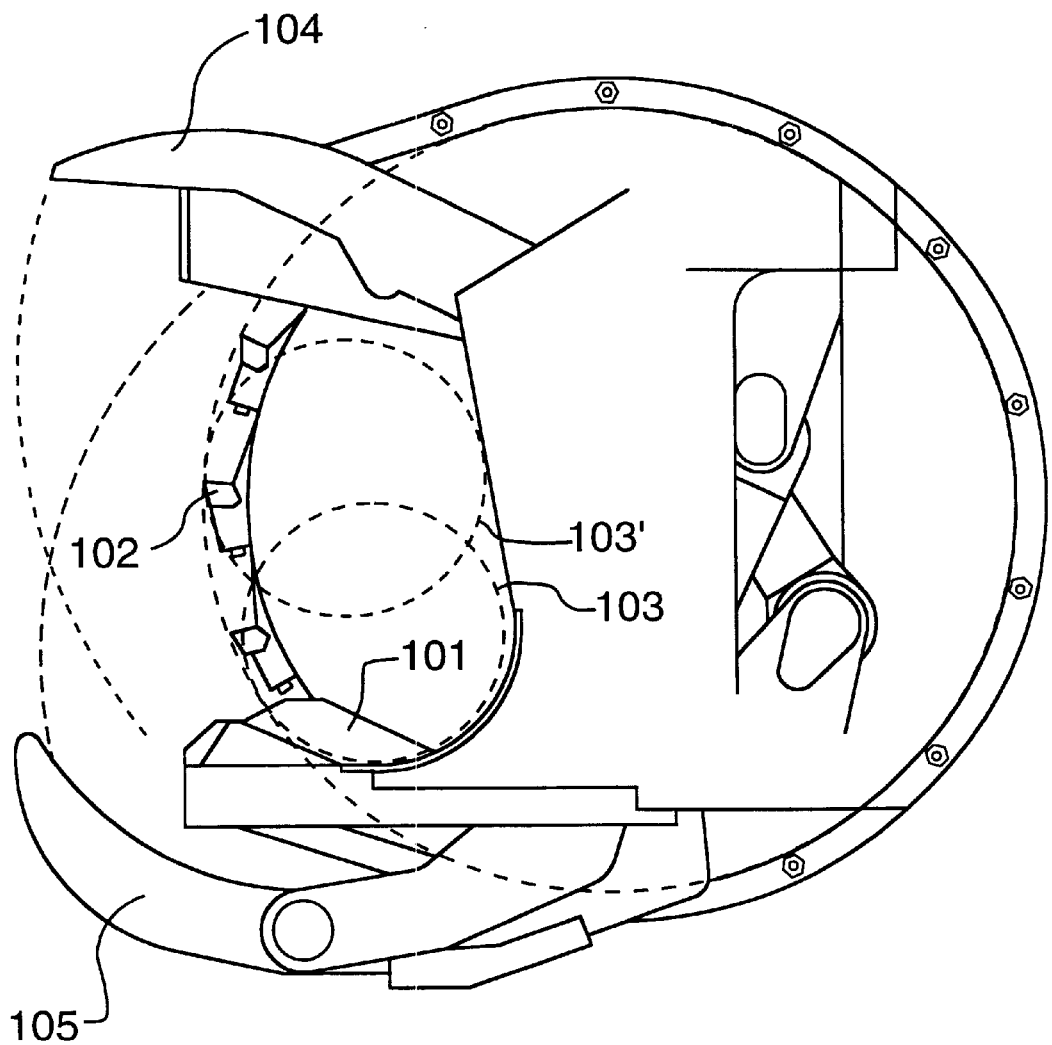
FIG. 17 (prior art) is a plan view of an earlier Koehring-Waterous saw head.
Figure 18:
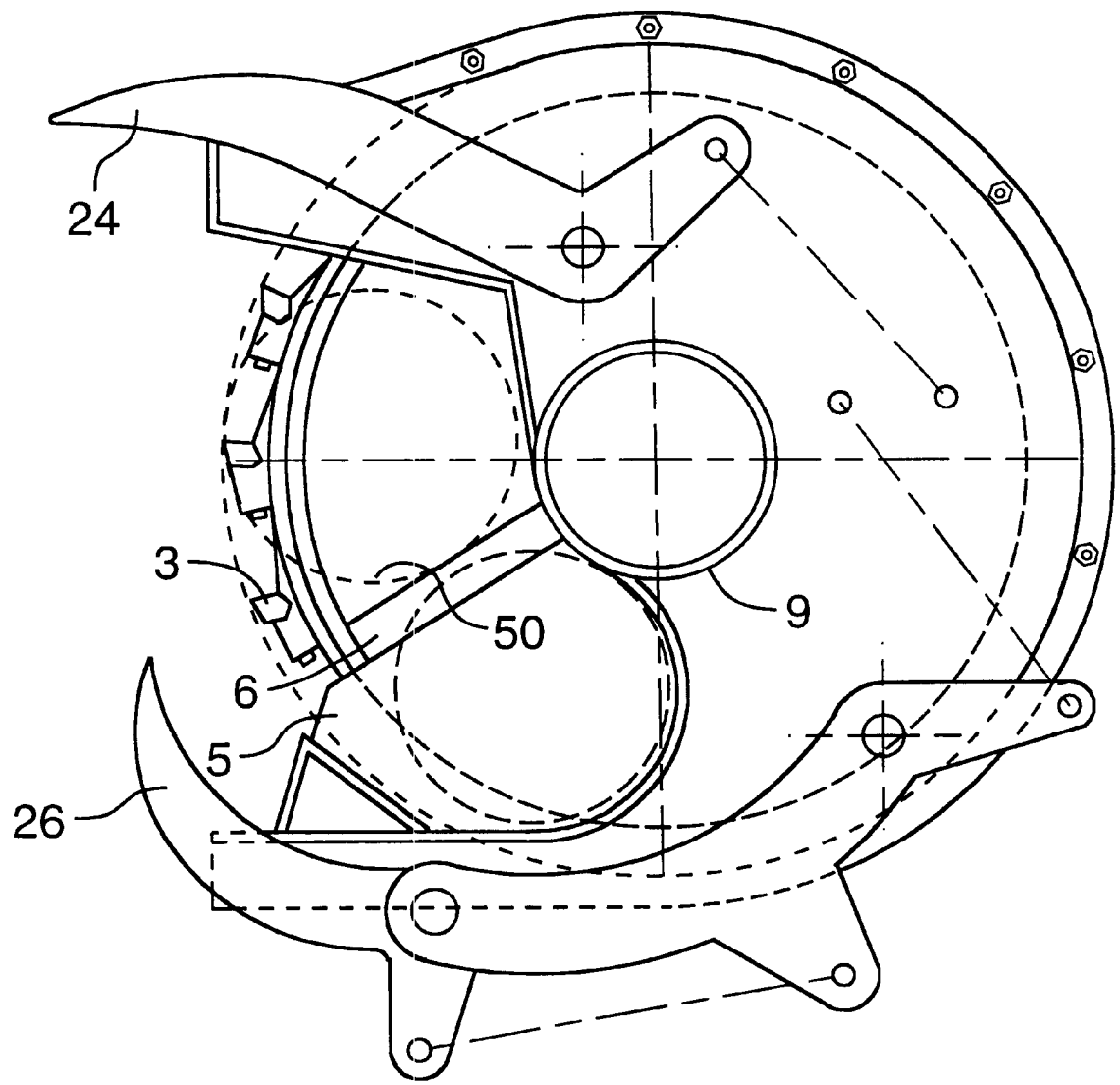
FIG. 18 is a plan view of a possible embodiment of the invention with taker and tucker arms on opposite side of the fore-and-aft centerline from each other.

For example, it should be clearly understood that variations on the arm configurations of FIGS. 4 and 17 (both prior art) could be adapted to the invention, particularly if any arms on the same side as the accumulation area are pivoted from points which are displaced far enough to the side or front so as not to encroach on the accumulation area and so as to sweep far enough rearwardly. FIG. 18 illustrates just one such possible variation. It should be clear that this is not as good an embodiment as the preferred embodiment, and does not have all of the advantages of the preferred embodiment.

In the invention, as illustrated in the various drawings of the preferred embodiment, as soon as the first tree is severed, the taker arm 24 is actuated by the operator to sweep the base of the severed tree up the ramp 6 to the rear of the accumulation area 5. The operator then positions the tucker arm 26 against the tree, to hold the tree in place in the accumulation area. The operator then retracts the taker arm and severs another tree, and then actuates the taker arm to sweep the tree to the accumulation area. The sequence continues, until the accumulation area is filled, whether by a single large tree or by a number of small trees. This operation of takers and tuckers generally is well known, although pivoting the taker and tucker arms from the same side of the centerline and sweeping to a large accumulation area was new in the above-mentioned U.S. Pat. No. 5,697, 412. The advantages of pivoting both arms from the side opposite the accumulation area are well described in the U.S. Pat. No. 5,697,412. That is optimal, but by no means essential to the present invention.

Being able to sweep at least the leading edge of the taker and tucker arms over the saw axis is a significant feature of the invention. In itself, that feature is not sufficient to create a large accumulation area, but it provides much greater flexibility in arm configuration and pivot point location, thereby making it easier to optimize the accumulation area and the overall design.

The preferred large accumulation area 5 in the invention is obtained by extending the area out over at least a portion of the rim, and preferably over and beyond the circumference of the saw. The bottom plate of the accumulation area thus is made high enough to achieve this. Thus the tree accumulation area location is not restricted to the area above the saw disc, and can be optimally located and shaped to suit center of gravity preferences and taker and tucker arm geometry. The accumulation area in the preferred embodiment is far enough from the severance area that a maximum-size tree can be totally severed and then swept away from the severance area and up the ramp to the accumulation area. Trees that are smaller than the maximum size are, after severance, first slid along the butt plate 4 before being swept up the ramp into the accumulation area. The ramp should not encroach on the tree severance space, so that in general, trees are not lifted until they are completely severed.

The large accumulation area in the preferred embodiment also arises by extending the area rearwardly as far as possible, i.e. preferably at least beyond a lateral line through the saw axis, and preferably well beyond that, as illustrated. Extending the accumulation area beyond the saw circumference of course liberates space instead of having to follow the rim radius when progressing rearwardly from the lateral line through the saw axis. Extending rearwardly and outwardly is facilitated by the arms being pivoted from the opposite side of the head, and by being able to swing at least leading edge portions of the arms over the saw axis, although effective sweeping into the accumulation area could be accomplished by appropriate selection of alternative arm shapes and pivot point locations.

It should be emphasized that the preferred embodiment provides sufficient space for storage of maximum-size trees away from the severance area. However, embodiments where the accumulation area does not necessarily extend as far as in the preferred embodiment are also contemplated. An accumulation area which extends over at least part of the rim sufficiently to store trees away from the severance area is still advantageous, even though not optimal.

Figure 9:
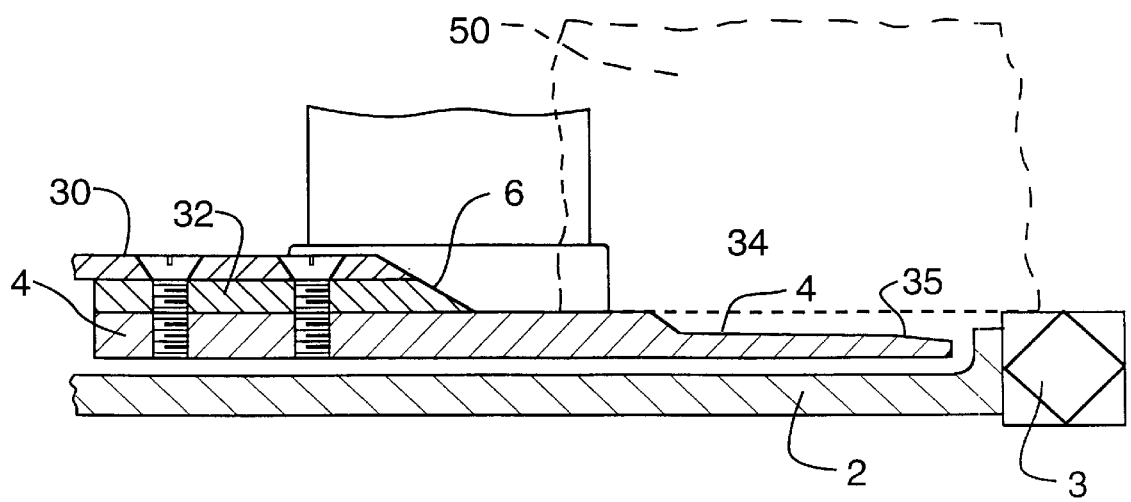
FIG. 9 is a cross-sectional elevation view, at 9—9 of FIG. 8.

The actual ramp construction clearly could be varied, but as seen in FIG. 9, the ramp 6 in the preferred embodiment is actually defined by a spacer 32 and the bottom plate 30 of the accumulation area, these together being bolted (or otherwise secured) to the butt plate 4.

The butt plate itself preferably has a raised inner portion 34, by virtue of the outer portion being machined down to create a thinner than conventional butt plate. Only large trees will contact the raised inner portion before being severed.

Figure 11:
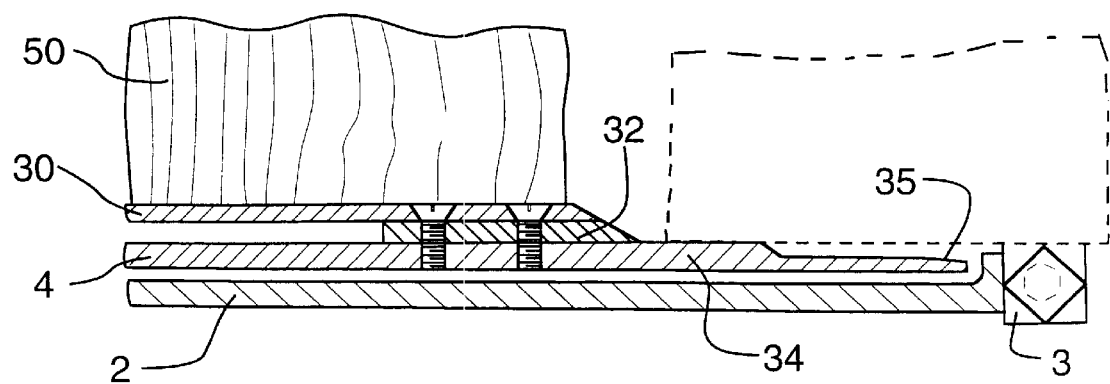
FIG. 11 is a cross-sectional elevation view, at 11—11 of FIG. 10.

FIG. 10 shows a large tree 50 in the accumulation area 5, with there still being room to sever and accommodate a second large tree to rest on the raised inner portion 34 of the butt plate, as can be seen in FIG. 11.

Figure 12:
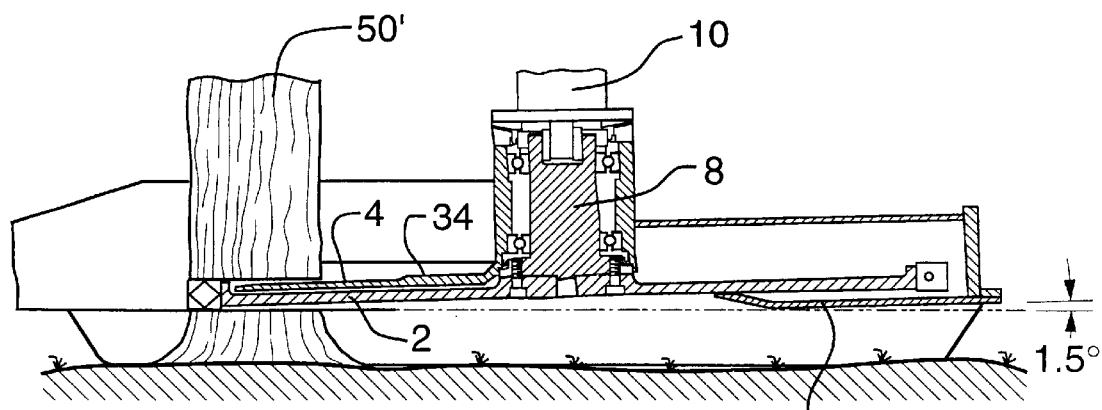
FIG. 12 is a cross-sectional elevation view, showing the saw completely through a small tree, with the disc tilted at about 1.5 degrees so as to be able to clear the stump as the saw moves forward horizontally.
Figure 13:
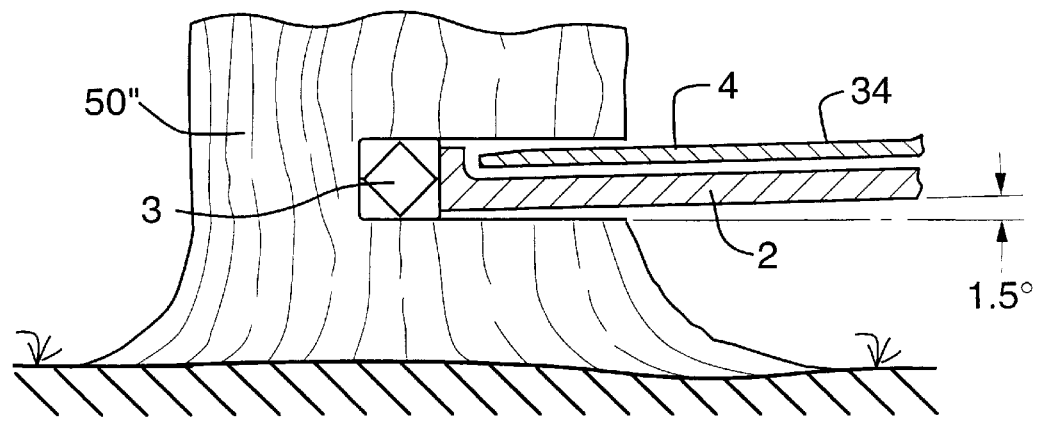
FIG. 13 is a cross-sectional elevation view, showing the saw being fed horizontally through a medium-size tree.
Figure 14:
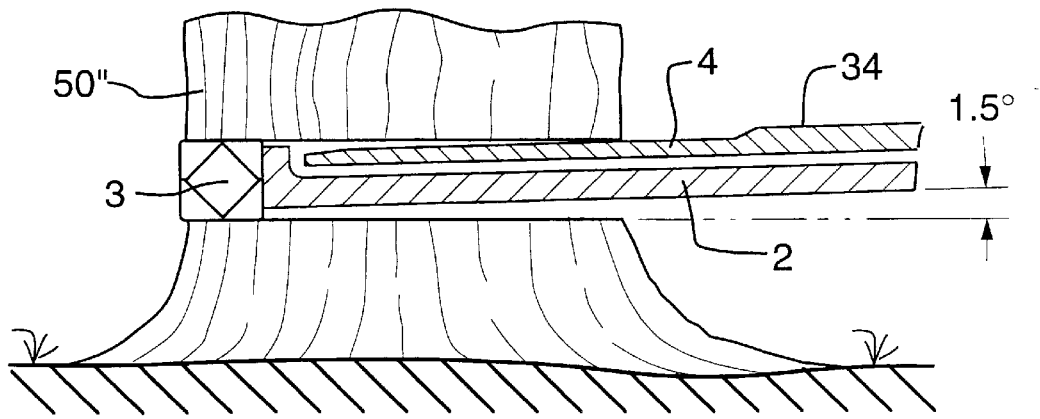
FIG. 14 is a cross-sectional elevation view corresponding to FIG. 13, showing the saw fully through the medium-size tree.
Figure 15:
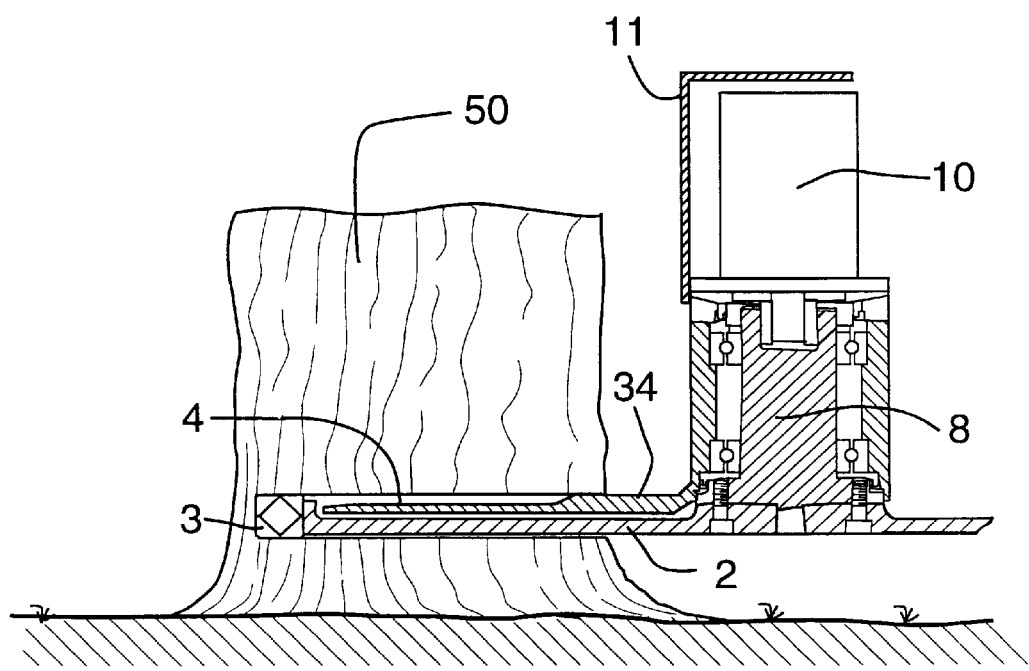
FIG. 15 is a cross-sectional elevation view, showing the saw almost fully through a large-size tree.

FIG. 12 shows that a small tree 50' will be severed before coming into contact with the raised inner portion of the butt plate. FIGS. 13 and 14 show that a medium-size tree 50" can be cut with the head moving forward horizontally, with the head and the saw disc at a 1.5 degree angle relative to the horizontal. The butt of the tree comes into contact with the butt plate only at the point of severance, due to the clearance above the butt plate which the reduced butt plate thickness provides. FIG. 15 shows a large tree 50 being supported on the raised inner portion before being severed.

The reduced butt plate thickness in the preferred embodiment arises by virtue of the outer portion being machined down to create a thinner than conventional butt plate. This thinner butt plate is a particularly advantageous feature of the invention, and is made possible by the fact that the trees are not stored on the butt plate, but rather are stored in the separate accumulation area. This means that the butt plate does not have to be designed to support the trees for storage, which means that at least the outer portion thereof can be made thinner. In conventional disc saws with butt plates, the combined thickness of the saw disc and the butt plate, and the limited clearance space between them, often results in the buff plate being forced down onto the saw disc if the saw and its forward movement are not completely level. About the best that the prior art has been able to accomplish is positioning the top of the butt plate at the same level as the top of the kerf, i.e. in line with the top of the saw tooth or teeth, as shown in FIGS. 16A and 16B (both prior art). In the invention, as shown in FIG. 16C, it is possible to remove ¼ inch from the thickness of the main body of the butt plate, i.e. from the conventional ⅝ inch down to ⅜ inch, creating a butt plate which is sunken 9/16 inch below the kerf. In FIG. 16D, an alternative embodiment, it is shown that even with a very strong 15/16 inch butt plate, the present invention can provide a butt plate which is still ¾ inch at the reduced area and 3/16 inch below the kerf.

Note that the kerf could be created by teeth which are co-planar, or, as is known in the prior art, by upper and lower edges respectively of teeth which alternately project slightly upwardly and downwardly relative to each other.

The advantage of a thinner buff plate can be seen most clearly in FIGS. 13 and 14, showing the cutting of a medium-size tree 50". As can be seen in FIG. 12, the saw disc can be angled slightly, at 1.5 degrees for example, which is sufficient to avoid friction between the bottom of the saw disc and the tree stump. In the prior art, this would result in the portion of the tree above the butt plate bearing against the butt plate, and wedging down onto the saw disc. However, in the invention, as can be seen in FIGS. 13 and 14, there is basically no contact between the tree and the butt plate until the tree is severed. As can be seen in FIG. 12, a small tree 50' can be fully severed without the butt plate coming into contact with the upper portion of the tree at all. Furthermore, the 1.5 degree angle is sufficient for the "stump jumper" 55 at the back of the head to clear the stump, thus permitting the operator to move continuously forward from tree to tree without necessarily having to raise the head after each cut.

In summary, the preferred embodiment of the invention provides an improved disc saw felling head by providing an elevated storage or accumulation area removed from the severance area, which can extend rearwardly and outwardly over at least the rim of the saw disc, and preferably over and well beyond the saw teeth. The preferred taker and tucker arm configuration, and using a relatively low motor and spindle where applicable, facilitates sweeping trees well to the rear of a lateral centerline. The fact that trees are not stored on the butt plate permits a thinner butt plate to be used, such that it can be recessed beneath the top of the kerf, with the advantages just described above. The recessing can be achieved even if the butt plate is not thinner than in the prior art, and thus is not dependent on the presence of a separate accumulation area, although that is preferable. In heavy tree work, a full-thickness butt plate is preferable, and will work well in combination with the large accumulation area, and will have a long service life.

When a thickness of butt plate is used that provides a clearance above the butt plate relative to the saw kerf, then the head offers tilt-angle, stump-clearing, felling-on-the-go advantages. By reducing the thickness of the butt plate, these advantages would be available on any saw which did not try to store trees on the saw rim, i.e. where the butt plate only was used for storage.

The invention thus provides a number of clear advantages over the prior art. The claims which follow are intended to capture not only the optimal, preferred embodiment described above, but also those variations which may be less than optimal but which still represent an improvement over the prior art.

What is claimed as the invention is:

1. A tree felling and accumulating head comprising:
   a support frame securable to a logging vehicle;
   a circular saw rotatably mounted on said support frame for rotation about a saw axis which is generally vertical in normal operation, said saw having an exposed front portion;
   an accumulation area for accumulating severed trees, at a higher elevation than said butt plate;
   a plurality of arms pivotally mounted on said support frame; and
   at least one of the arms sweeps severed trees from said butt plate into said accumulation area, by having a portion of the at least one of the arms swing.

2. A tree felling and accumulating head as recited in claim 1, wherein said saw comprises a saw disc having a rim around the circumference thereof and a number of teeth around the circumference of said rim, and wherein said accumulation area is sufficiently elevated to extend, and does extend, at least above at least a portion of said rim, outwardly from said saw axis on one side thereof.

3. A tree felling and accumulating head as recited in claim 2, wherein said accumulation area is sufficiently elevated to extend, and does extend, angst above said teeth, outwardly from said saw axis on one side thereof.

4. A tree felling and accumulating head as recited in claim 3, wherein said accumulation area is sufficiently elevated to extend, and does extend, beyond said teeth, outwardly from said saw axis on one side thereof.

5. A tree felling and accumulating head as recited in claim 1, where said accumulation area extends a substantial distance rearwardly from said severance area, namely at least beyond a lateral line through said saw axis.

6. A tree felling and accumulating head as recited in claim 4, where said accumulation area extends a substantial distance rearwardly from said severance area, namely at least beyond a lateral line through said saw axis.

7. A tree felling and accumulating head as recited in claim 1, wherein said plurality of arms comprise at least one taker arm and at least one tucker arm.

8. A tree felling and accumulating head as recited in claim 7, wherein said taker and tucker arms are pivotally mounted on the opposite side of a fore-and-aft line through said saw axis from the side occupied by said accumulation area.

9. A tree felling and accumulating head as recited in claim 8, where said arms are pivotally mounted on substantially the same arm axis.

10. A tree felling and accumulating head as recited in claim 6, wherein said plurality of arms comprise at least one taker arm and at least one tucker arm.

11. A tree felling and accumulating head as recited in claim 10, wherein said taker and tucker arms are pivotally mounted on the opposite side of a fore-and-aft line through said saw axis from the side occupied by said accumulation area.

12. A tree felling and accumulating head as recited in claim 11, where said arms are pivotally mounted on substantially the same arm axis.

13. A tree felling and accumulating head as recited in claim 12, further comprising a motor mounted on said frame, connected to drive said saw, wherein said motor is above said saw disc, and wherein said motor is low enough and arms are high enough to permit pivoting of at least one of said arms over said saw axis.

14. A tree felling and accumulating head as recited in claim 7, wherein said arms are pivotable such that at least portions thereof swing over said saw axis to sweep trees into said accumulation area.

15. A tree felling and accumulating head as recited in claim 14, further comprising a motor mounted on said frame, connected to drive said saw, wherein said motor is above said saw disc, and wherein said motor is low enough and said arms are high enough to permit pivoting of at least one of said arms over said saw axis.

16. A tree felling and accumulating head as recited in claim 10, wherein said arms are pivotable such that at least portions thereof swing over said saw axis to sweep to trees into said accumulation area.

17. A tree felling and accumulating head as recited in claim 16, further comprising a motor mounted on said frame, connected to drive said saw, wherein said motor is above said saw disc, and wherein said motor is low enough and said arms are high enough to permit pivoting of at least one of said arms over said saw axis.

18. A tree felling and accumulating head as recited in claim 1, where at least an outer portion constituting a substantial overall portion of said buft plate has its upper surface below the upper plane of said saw kerf.

19. A tree felling and accumulating head as recited in claim 18, where said butt plate has a radially inner portion which is thicker than outer portions thereof and which has its upper surface above the upper surface of said outer portions.

20. A tree felling and accumulating head comprising:
a support frame securable to a logging vehicle;
a circular saw rotatably mounted on said support frame for rotation about a saw axis which is generally vertical in normal operation, said saw having an exposed from portion;
a butt plate overlying said saw adjacent said exposed front portion; an accumulation area for accumulating severed trees, separate from said severance area; and
a plurality of arms pivotally mounted on said support frame to sweep severed trees from said butt plate and into said accumulation area;
wherein said arms are pivotable such that at least a portion of at least are arm swings over said saw axis.

21. A tree felling and accumulating head as recited in claim 20, further comprising a motor mounted on said frame, connected to drive said saw, wherein said motor is above said saw disc, and wherein said motor is low enough and said arms are high enough to permit pivoting of at least one of said arms over said saw axis.

22. A tree felling and accumulating head as recited in claim 20, wherein said saw comprises a saw disc having a rim around the circumference thereof and a number of teeth around the circumference of said rim, and wherein said accumulation area is sufficiently elevated to extend, and does extend, at least above at least a portion of said rim, outwardly from said saw axis on one side thereof.

23. A tree felling and accumulating head as recited in claim 22, wherein said accumulation area is sufficiently elevated to extend, and does extend, at least above said teeth, outwardly from said saw axis on one side thereof.

24. A tree felling and accumulating head as recited in claim 23, wherein said accumulation area is sufficiently elevated to extend, and does extend, beyond said teeth, outwardly from said saw axis on one side thereof.

25. A tree felling and accumulating head as recited in claim 20, where said accumulation area extends a substantial distance rearwardly from said severance area, namely at least beyond a lateral line through said saw axis.

26. A tree felling and accumulating head as recited in claim 20, wherein said plurality of arms comprise at least one taker arm and at least one tucker arm.

27. A tree felling and accumulating head as recited in claim 26, wherein said taker and tucker arms are pivotally mounted on the opposite side of a fore-and-aft line through said saw axis from the side occupied by said accumulation area.

28. A tree felling and accumulating head as recited in claim 27, where said arms are pivotally mounted on substantially the same arm axis.

29. A method of severing a tree with a tree felling and accumulating head, comprising the steps of:
advancing the head to a tree;
severing the tree with a circular saw mounted on the head to rotate about a saw axis, such that the tree then rests in a severance area on a butt plate above said circular saw; and
using at least one arm of a set of arms to sweep said tree from said butt plate into an elevated accumulation area, wherein at least a portion of at least one said arm sweeps over said saw axis.

30. The method of claim 29, wherein said accumulation area is elevated above said butt plate sufficiently high to extend over, and does extend over, at least a portion of an outer rim of said saw, and is separated from said butt plate by a ramp.

31. The method of claim 30, wherein said accumulation area is sufficiently elevated to extend, and does extend, at least above said teeth, outwardly from said saw axis on one side thereof.

32. The method of claim 31, wherein said accumulation area is sufficiently elevated to extend, and does extend, beyond said teeth, outwardly from said saw axis on one side thereof.

33. The method of claim 29, where said accumulation area extends a substantial distance rearwardly from said severance area, namely at least beyond a lateral line through said saw axis.

34. A tree felling and accumulating head comprising:
a support frame securable to a logging vehicle;
a circular saw rotatably mounted on said support frame for rotation about a saw axis which is generally vertical in normal operation, said saw having an exposed front portion;

a butt plate overlying said saw adjacent said exposed front portion, providing a severance area radially inward from the circumference of said saw and said exposed front portion;

an accumulation area for accumulating severed trees, at a higher elevation than said butt plate and separate from said severance area; and a plurality of arms, comprising at least one taker arm and at least one tucker arm, pivotally mounted on said support frame to sweep severed trees from said butt plate into said accumulation area, wherein said taker and tucker arms are pivotally mounted on the opposite side of a fore-and-aft line through said saw axis from the side occupied by said accumulation area.

35. A tree felling and accumulating head as recited in claim 34, where said arms are pivotally mounted on substantially the same arm axis.

* * * * *

UNITED STATES PATENT AND TRADEMARK OFFICE
CERTIFICATE OF CORRECTION

PATENT NO. : 6,152,201
DATED : Nov. 28, 2000
INVENTOR(S) : Kurelek

It is certified that error appears in the above-identified patent and that said Letters Patent is hereby corrected as shown below:

Col. 1, line 7 - before "which", delete -- a --.
Col. 1, line 19 - "tree-cufting" should be -- tree-cutting --.
Col. 2, line 3 - "buff" should be -- butt --.
Col. 3, line 2 - "buft" should be -- butt --.
Col. 3, line 21 - after "distance", delete -- so --.
Col. 4, line 40 - "I" should be -- 1 --.
Col. 7, line 18 - "buff" should be -- butt --.
Col. 8, line 31 - delete "swing", and insert -- swinging over said saw axis --.
Col. 8, line 41 - "angst" should be -- at least --.
Col. 9, line 13 - after "and", insert -- said --.
Col. 9, line 29 - delete the second occurrence of "to".
Col. 9, line 40 - "buft" should be -- butt --.
Col. 9, line 60 - "are" should be -- one --.

Signed and Sealed this

Eighth Day of May, 2001

Attest:

NICHOLAS P. GODICI

Attesting Officer    Acting Director of the United States Patent and Trademark Office